(12) United States Patent
Kuruma et al.

(10) Patent No.: US 9,640,845 B2
(45) Date of Patent: May 2, 2017

(54) TEMPERATURE-RAISING DEVICE AND TEMPERATURE-RAISING METHOD FOR IN-CAR BATTERY

(71) Applicant: TOYOTA JIDOSHA KABUSHIKI KAISHA, Toyota-shi, Aichi-ken (JP)

(72) Inventors: Yusuke Kuruma, Toyota (JP); Takashi Murata, Kasugai (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/974,450

(22) Filed: Dec. 18, 2015

(65) Prior Publication Data

US 2016/0190661 A1 Jun. 30, 2016

(30) Foreign Application Priority Data

Dec. 24, 2014 (JP) .................................. 2014-260879

(51) Int. Cl.
| | |
|---|---|
| H01M 10/635 | (2014.01) |
| B60L 11/18 | (2006.01) |
| H01M 10/48 | (2006.01) |
| H01M 10/625 | (2014.01) |
| H01M 10/615 | (2014.01) |

(52) U.S. Cl.
CPC ......... *H01M 10/635* (2015.04); *B60L 11/182* (2013.01); *B60L 11/1875* (2013.01); *H01M 10/486* (2013.01); *H01M 10/615* (2015.04); *H01M 10/625* (2015.04); *B60L 2240/545* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2005/0264257 | A1* | 12/2005 | Inui .......................... | B60L 1/10 320/104 |
| 2007/0024244 | A1* | 2/2007 | Zhu .......................... | B60K 6/48 320/150 |
| 2012/0222438 | A1 | 9/2012 | Osaka et al. | |
| 2013/0162027 | A1 | 6/2013 | Yamamoto et al. | |

(Continued)

FOREIGN PATENT DOCUMENTS

| | | |
|---|---|---|
| JP | 2003-157912 A | 5/2003 |
| JP | 2005-339980 A | 12/2005 |
| JP | 2011-111140 A | 6/2011 |

(Continued)

*Primary Examiner* — Thomas Tarcza
*Assistant Examiner* — Garrett Evans
(74) *Attorney, Agent, or Firm* — Sughrue Mion, PLLC (57) ABSTRACT

A temperature-raising device for an in-car battery includes: a battery temperature acquisition unit configured to acquire a temperature of a battery mounted in a vehicle; an environmental temperature acquisition unit configured to acquire an environmental temperature; a heater configured to raise the temperature of the battery; and a controller configured to i) turn ON or OFF the heater based on a result of a comparison between the battery temperature acquired by the battery temperature acquisition unit and a predetermined threshold, and ii) reduce the threshold in accordance with a reduction in the environmental temperature acquired by the environmental temperature acquisition unit.

4 Claims, 7 Drawing Sheets

(56) References Cited

U.S. PATENT DOCUMENTS

2015/0079433 A1 3/2015 Tamai et al.

FOREIGN PATENT DOCUMENTS

| JP | 2012-44813 A | 3/2012 |
|---|---|---|
| JP | 2012-191781 A | 10/2012 |
| JP | 2013-30394 A | 2/2013 |
| WO | 2013/141090 A1 | 9/2013 |

* cited by examiner

TEMPERATURE-RAISING DEVICE AND TEMPERATURE-RAISING METHOD FOR IN-CAR BATTERY

INCORPORATION BY REFERENCE

The disclosure of Japanese Patent Application No. 2014-260879 filed on Dec. 24, 2014 including the specification, drawings and abstract is incorporated herein by reference in its entirety.

BACKGROUND OF THE INVENTION

1. Field of the Invention

The invention relates to a temperature-raising device and a temperature-raising method for raising a temperature of a battery mounted in a vehicle.

2. Description of Related Art

In the related art, an electric vehicle that uses a rotary electric machine as a power source is widely known, examples of which include a hybrid car and an electric car. In the electric vehicle, a battery is mounted in order to supply electric power to the rotary electric machine. The in-car battery is a secondary battery that can be charged and discharged. The in-car battery can be charged with electric power generated by the rotary electric machine and electric power from an external electric power supply. The in-car battery has a low charging capacity at a low temperature, and then the length of time that is required for charging increases due to a reduction in allowable charging current. In addition, the in-car battery cannot be charged or discharged in a case where the temperature of the in-car battery decreases to the point of reaching a freezing temperature.

In some cases, the electric vehicle is put into a plug-in connection state, where the in-car battery and the external electric power supply are connected to each other, for charging after being stopped. When an environmental temperature is low in this case, the temperature of the battery decreases with time, and a problem arises in the form of charging using the external electric power supply not being appropriately performed. In this regard, an increase in the temperature of the in-car battery by the use of a heater has been proposed so that the temperature of the in-car battery becomes equal to or higher than a reference value in the plug-in connection state. In addition, calculation of a battery temperature-raising time allowing for the environmental temperature has been proposed. For example, Japanese Patent Application Publication No. 2012-191781 discloses prediction of a battery temperature transition from the battery temperature and the environmental temperature at the current point in time and prediction of the battery temperature-raising time and electric power consumption. According to this technique, charging of the battery or the like can be efficiently performed.

SUMMARY OF THE INVENTION

In the meantime, there are regions across the world that have an extremely low outside temperature. Fairbanks, for example, has an average minimum temperature of lower than −20° C. in some months. In a case where an operation for raising the temperature of the in-car battery similar to those performed in other regions is performed in such a frigid region, the operating time of the heater for heating purposes significantly increases, and then problems could arise such as an increase in electric power consumption and a reduction in the life of an electrical component relating to the heater.

The invention provides a temperature-raising device and a temperature-raising method to inhibit the shortening of the life of a heater for an in-car battery even in a frigid environment.

According to an aspect of the invention, there is provided a temperature-raising device for an in-car battery, the temperature-raising device including: a battery temperature acquisition unit configured to acquire a temperature of a battery mounted in a vehicle; an environmental temperature acquisition unit configured to acquire an environmental temperature; a heater configured to raise the temperature of the battery; and a controller configured to i) turn ON or OFF the heater based on a result of a comparison between the battery temperature acquired by the battery temperature acquisition unit and a predetermined threshold, and ii) reduce the threshold in accordance with a reduction in the environmental temperature acquired by the environmental temperature acquisition unit.

The controller may be configured to i) set the threshold to a standard value defined in advance in a case where the environmental temperature acquired by the environmental temperature acquisition unit is equal to or higher than a reference environmental temperature defined in advance, and ii) set the threshold to a value lower than the standard value in a case where the environmental temperature acquired by the environmental temperature acquisition unit is lower than the reference environmental temperature.

The battery temperature acquisition unit may have a temperature sensor installed around the in-car battery, and the environmental temperature acquisition unit may be configured to estimate the environmental temperature based on a battery temperature detected by the temperature sensor. The environmental temperature acquisition unit may be configured to i) estimate a battery temperature after a passage of a predetermined period of time based on an estimated environmental temperature at a current point in time and the battery temperature detected by the temperature sensor at the current point in time, and ii) correct the estimated environmental temperature in accordance with an error between the battery temperature detected by the temperature sensor and the estimated battery temperature after the passage of the predetermined period of time.

The controller may be configured to execute a temperature-raising operation for the in-car battery in a plug-in state where the in-car battery is electrically connected to an external electric power supply.

According to another aspect of the invention, there is provided a temperature-raising method for a battery mounted in a vehicle, the vehicle including a temperature sensor configured to acquire a temperature of the battery and a controller, the temperature-raising method including: acquiring the temperature of the battery mounted in the vehicle by the temperature sensor; turning ON or OFF the heater raising the temperature of the battery by the controller based on a result of a comparison between the acquired battery temperature and a predetermined threshold; acquiring an environmental temperature of the vehicle by the controller; and reducing the threshold by the controller in accordance with a reduction in the acquired environmental temperature.

According to the aspects of the invention, the threshold for turning the heater ON or OFF is reduced in accordance with a reduction in the environmental temperature, and thus an excessive increase in heater operation time can be suppressed and shortening of the life of the heater can be suppressed even in a frigid environment.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
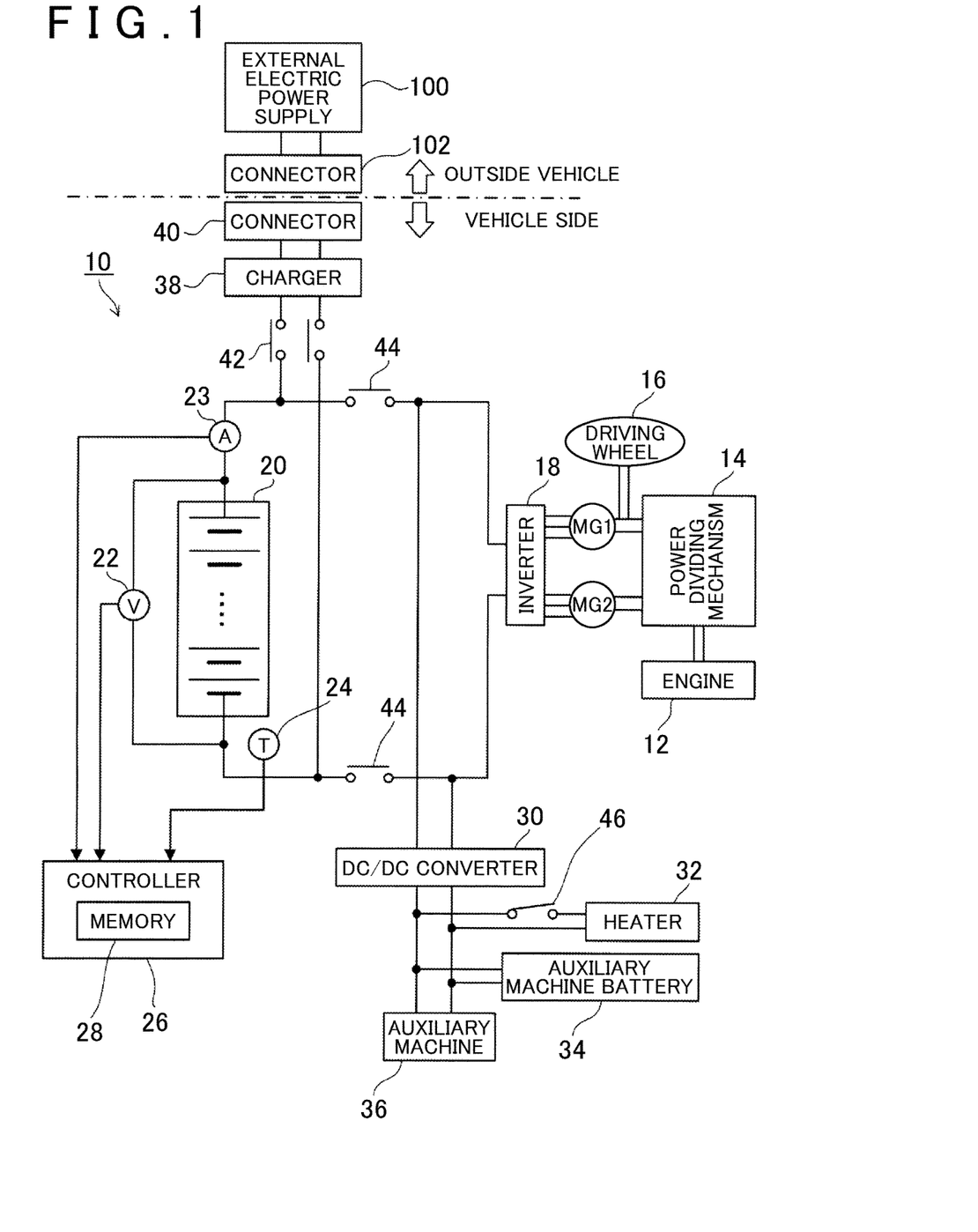
FIG. 1 is a drawing illustrating a schematic configuration of a hybrid driving system according to an embodiment of the invention.

Hereinafter, an embodiment of the invention will be described with reference to accompanying drawings. FIG. 1 is a drawing illustrating a schematic configuration of a hybrid driving system 10 according to the embodiment of the invention. In the hybrid driving system 10, two rotary electric machines MG1, MG2 and one engine 12 are disposed as power sources. A main battery 20, which supplies electric power to the rotary electric machines MG1, MG2 or stores electric power generated by the rotary electric machines MG1, MG2, is disposed in the hybrid driving system 10. The main battery 20 has a plurality of electric cells that are connected in series. A secondary battery such as a nickel-hydrogen battery and a lithium-ion battery can be used as the electric cell. In addition, an electric double layer capacitor can be used instead of the secondary battery as the electric cell. A plurality of electric cells that are connected in parallel may be included in the main battery 20.

A voltage value VB of the main battery 20 is detected by a voltage sensor 22 and is input to a controller 26. A current value IB of a current of the main battery 20 is detected by a current sensor 23 and is input to the controller 26. A temperature sensor 24, which detects a temperature of the main battery 20 (battery temperature Tb), is disposed in the vicinity of the main battery 20. The temperature sensor 24 functions as a battery temperature acquisition unit that acquires the battery temperature Tb. The battery temperature Tb that is detected by the temperature sensor 24 is input to the controller 26. The temperature sensor 24 may be one or more in number. In a case where a plurality of the temperature sensors 24 are disposed, it is desirable that the temperature sensors 24 are disposed at different positions.

During a temperature-raising operation (described later), an environmental temperature α as a temperature of an environment where the main battery 20 is installed also matters. This environmental temperature α is calculated by the controller 26. In other words, in this embodiment, the environmental temperature α is estimated from the battery temperature Tb as described in detail later. Accordingly, in this embodiment, the controller 26 is an environmental temperature acquisition unit that acquires the environmental temperature α. The environmental temperature α may be actually detected by the use of a temperature sensor or a temperature that is detected by, for example, a temperature sensor which is disposed outside a passenger compartment and a temperature sensor which is disposed in a refrigerant intake path in order to cool the main battery 20 may be used as the environmental temperature α.

The main battery 20 is connected to an inverter 18 via system main relays 44. When an ignition switch of a vehicle is switched from OFF to ON, the controller 26 electrically connects the main battery 20 and the inverter 18 to each other by switching the system main relays 44 from OFF to ON. When the ignition switch of the vehicle is switched from ON to OFF, the controller 26 electrically disconnects the main battery 20 and the inverter 18 from each other by switching the system main relays from ON to OFF.

The inverter 18 converts direct-current electric power that is supplied from the main battery 20 into alternating-current electric power and outputs the alternating-current electric power to the second rotary electric machine MG2. The second rotary electric machine MG2 generates kinetic energy for traveling of the vehicle by receiving the alternating-current electric power output from the inverter 18. The vehicle travels when the kinetic energy that is generated by the second rotary electric machine MG2 is transmitted to a driving wheel. In addition, the second rotary electric machine MG2 converts kinetic energy that is generated during braking of the vehicle into electrical energy. The inverter 18 converts alternating-current electric power (regenerative electric power) that is generated by the second rotary electric machine MG2 into direct-current electric power and supplies the direct-current electric power to the main battery 20. The main battery 20 is charged in this manner.

A power dividing mechanism 14 transmits power of the engine 12 to a driving wheel 16 or transmits the power of the engine 12 to the first rotary electric machine MG1. The first rotary electric machine MG1 generates electric power by receiving the power of the engine 12. The electric power that is generated by the first rotary electric machine MG1 is supplied to the second rotary electric machine MG2 or is supplied to the main battery 20 via the inverter 18. The main battery 20 is charged by the electric power being supplied to the main battery 20.

A booster circuit (not illustrated) is disposed in a current path between the main battery 20 and the inverter 18. The booster circuit boosts an output voltage of the main battery 20 and outputs electric power after the boosting to the inverter 18. In addition, the booster circuit steps down an output voltage of the inverter 18 and outputs electric power after the step-down to the main battery 20.

A DC/DC converter 30 is also connected to the main battery 20. The DC/DC converter 30 is connected in parallel to the inverter 18. An auxiliary machine 36, an auxiliary machine battery 34, and a heater 32 are connected to the DC/DC converter 30. The DC/DC converter 30 steps down the output voltage of the main battery 20 and supplies electric power after the step-down to the auxiliary machine 36 and the auxiliary machine battery 34. Then, the auxiliary machine 36 can be put into operation or the auxiliary machine battery 34 can be charged. An operation of the DC/DC converter 30 is controlled by the controller 26.

The heater 32 is used to raise the temperature of the main battery 20. In FIG. 1, the heater 32 is disposed at a position spaced apart from the main battery 20. In actuality, however, the heater 32 is disposed in the vicinity of the main battery 20. In addition, the heater 32 may be one or more in number. A switch 46 is disposed in a current path between the DC/DC converter 30 and the heater 32. This switch 46 is switched between ON and OFF in response to a control signal from the controller 26. When the switch 46 is ON, predetermined electric power is supplied from the DC/DC converter 30 to the heater 32 and the heater 32 is allowed to generate heat. The temperature of the main battery 20 is raised when the heater 32 generates heat. Driving of the heater 32 is controlled by the controller 26. In other words, the heater 32, the temperature sensor 24, the controller 26, and the like constitute a temperature-raising device that raises the temperature of the main battery 20.

A charger 38 is also connected to the main battery 20. A charging relay 42 is disposed between the main battery 20 and the charger 38. The charging relay 42 is switched between ON and OFF in response to a control signal from the controller 26. A connector 40 (so-called inlet) is connected to the charger 38. The connector 40 can be connected to a connector 102 (so-called charging plug) of an external electric power supply 100 (such as a commercial electric power supply). The controller 26 monitors a state of connection between the two connectors 40, 102, that is, whether the two connectors 40, 102 are in a plug-in state where the two connectors 40, 102 are connected to each other or in a plug-out state where the two connectors 40, 102 are disconnected from each other.

When the connector 40 is connected to the connector 102 and the charging relay 42 is ON, the charger 38 converts alternating-current electric power from the external electric power supply 100 into direct-current electric power and outputs the direct-current electric power. Operations of the charger 38 and the charging relay 42 are controlled by the controller 26. The direct-current electric power that is output from the charger 38 is supplied to the main battery 20. Then, the main battery 20 is charged. In the following description, the charging of the main battery 20 by the use of the electric power from the external electric power supply 100 will be referred to as "external charging".

In the plug-in state, the electric power from the charger 38 can be supplied to the DC/DC converter 30 as well as the main battery 20. When the switch 46 is ON in this state, the DC/DC converter 30 can step down the electric power from the charger 38 and supply the electric power after the step-down to the heater 32. In other words, in the plug-in state, the temperature of the main battery 20 can be raised by the heater 32 being driven by the use of some of the electric power from the external electric power supply 100.

Hereinafter, a temperature-raising control for the main battery 20 in the hybrid driving system 10 will be described. The main battery 20 is characterized by having an extended period of charging time due to a reduction in charging capacity and a reduction in allowable charging amount when the temperature of the main battery 20 is reduced. In addition, charging and discharging of the main battery 20 might be impossible in a case where the temperature of the main battery 20 is excessively low. In this regard, the controller 26 executes the temperature-raising operation for the main battery 20 by the heater 32 in the plug-in state even after the vehicle is stopped.

In a hybrid vehicle, the external charging is available when the vehicle is stationary and a user can set a time when the external charging is terminated. In addition, the user can set a time of initiation of pre-air conditioning for turning air conditioning ON before a restart of the vehicle. In a case where the external charging termination time or the pre-air conditioning initiation time (hereinafter, both collectively referred to as a "set time tc") is set by the user, the controller 26 drives the heater 32 such that the temperature of the main battery 20 at the set time tc is equal to or higher than battery temperature lower limit value $Tb_{min}$ that is set. After the heater 32 is driven, the temperature-raising operation is executed in a case where a predetermined period of time (such as 72 hours) has passed since the initial driving of the heater 32 or until a plug-out.

In a case where the external charging termination time or the pre-air conditioning initiation time (set time tc) is not set, the heater 32 is driven such that the temperature of the main battery 20 becomes equal to or higher than the battery temperature lower limit value $Tb_{min}$ that is set until a predetermined period of time (such as 72 hours) passes after the plug-in state started.

Figure 2:
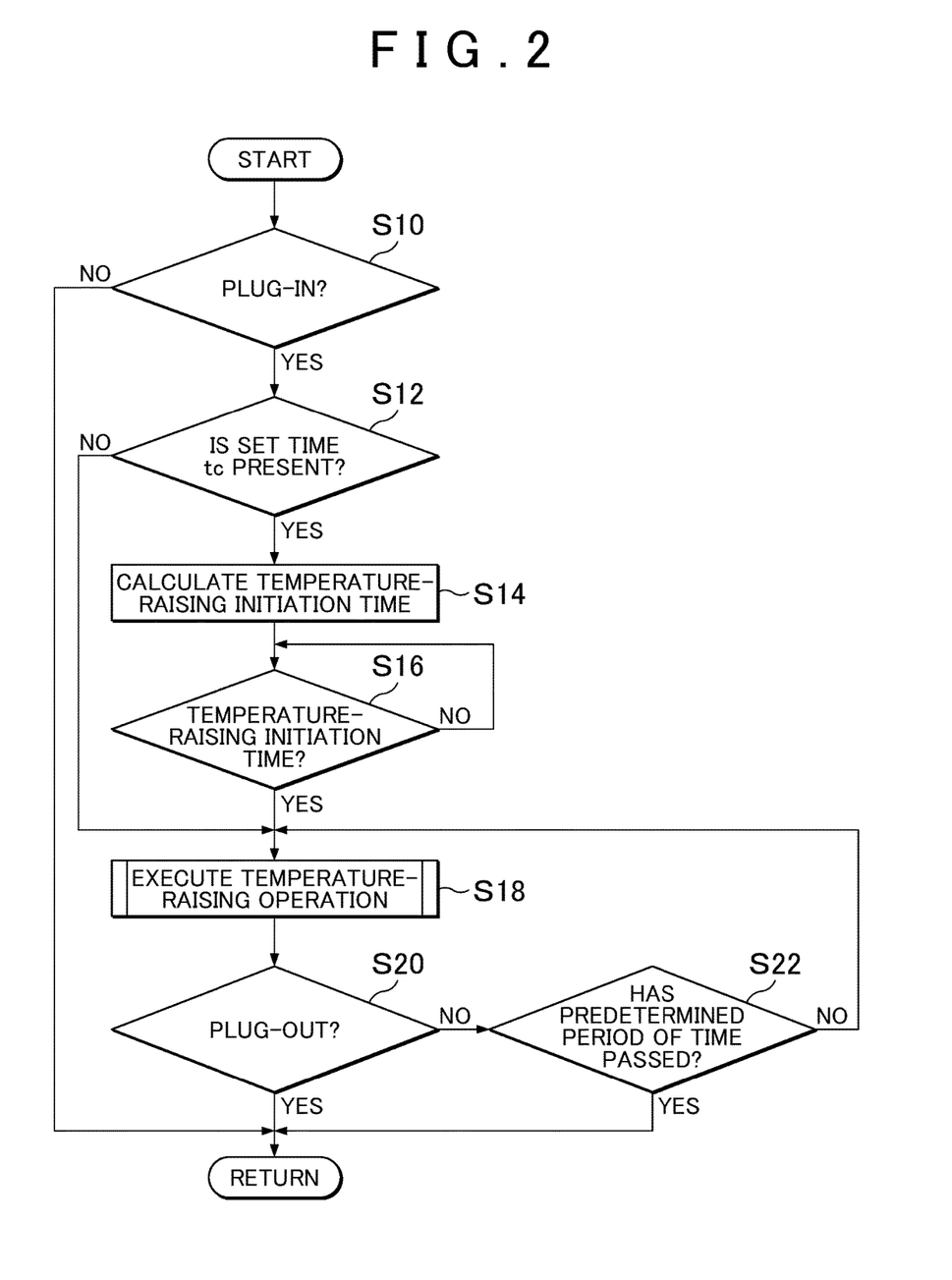
FIG. 2 is a flowchart illustrating a flow of a temperature-raising control.

FIG. 2 is a flowchart illustrating a flow of the temperature-raising control for the main battery 20. After the vehicle is stopped, the controller 26 monitors whether or not the vehicle is in the plug-in state (S10). After it is determined as a result of the monitoring that the vehicle is in the plug-in state, the controller 26 checks whether or not the set time tc is set (S12). In a case where the set time tc is not set, the controller 26 proceeds to S18 and executes the temperature-raising operation.

In a case where the set time tc is set, the controller 26 calculates a temperature-raising operation initiation time ts (S14). In the first step of the calculation of this temperature-raising operation initiation time ts, the length of time that is required for raising the temperature of the main battery 20 to the prescribed battery temperature lower limit value $Tb_{min}$, that is, a temperature-raising time tw is calculated. Then, the time that dates back by the temperature-raising time tw from the set time tc is calculated as the temperature-raising operation initiation time ts. The temperature-raising time tw can be obtained from parameters such as the battery temperature lower limit value $Tb_{min}$ (temperature-raising target temperature), the battery temperature Tb at the current point in time, the environmental temperature α, and the time left tr between the current time and the set time tc. A map or an arithmetic expression that shows a correspondence relationship between these parameters and the temperature-raising time tw is stored in a memory 28 of the controller 26. The controller 26 calculates the temperature-raising time tw by applying actually detected values of the parameters to the map or the arithmetic expression. The map that shows the correspondence relationship between the parameters and the temperature-raising time tw can be drawn up based on experiment and simulation results or the like. In addition, the following Equation 1 or the like can be used as the arithmetic expression that shows the correspondence relationship between the parameters and the temperature-raising time tw, in which B and C are predetermined constants.

$$tw = -\frac{1}{C}\ln\left\{\frac{(Tb-\alpha)e^{-C \cdot tr} + (\alpha+B)}{B}\right\} \quad \text{[Equation 1]}$$

After the calculation of the temperature-raising initiation time ts is allowed, the controller 26 stands by until the temperature-raising initiation time ts (S16). Then, after the temperature-raising initiation time ts is reached, the controller 26 drives the heater 32 and executes the temperature-raising operation (S18). In addition, the controller 26 puts a counter into operation at the point in time when the heater 32 is driven for the first time, and counts the length of time that passes from the initiation of the driving of the heater 32.

Then, the controller 26 repeats the temperature-raising operation until the execution of a plug-out in which the connector 40 of the vehicle is removed from the connector 40 of the external electric power supply 100 (Yes in S20) or the passage of a predetermined period of time from the initiation of the driving of the heater 32 (Yes in S22). In the case of the execution of the plug-out or the passage of the predetermined period of time from the initiation of the driving of the heater 32, the controller 26 stops the temperature-raising operation. The predetermined period of time is not particularly limited. The predetermined period of time is three days (72 hours) in this embodiment.

Hereinafter, the temperature-raising operation will be described. During the temperature-raising operation, the controller 26 turns ON or OFF the switch 46 of the heater 32 depending on the battery temperature Tb. More specifically, an ON temperature Ton and an OFF temperature Toff that is higher than the ON temperature Ton are stored in the memory 28 of the controller 26. The controller 26 turns ON the heater 32 when the battery temperature Tb that is detected by the temperature sensor 24 is lower than the ON temperature Ton and turns OFF the heater 32 when the battery temperature Tb is higher than the OFF temperature Toff. When the ON temperature Ton is allowed to be equal to the battery temperature lower limit value $Tb_{min}$ in this case, the temperature of the main battery 20 can be maintained at the battery temperature lower limit value $Tb_{min}$ (ON temperature Ton) or a higher temperature. The OFF temperature Toff is a value of the ON temperature Ton to which a certain degree of hysteresis is given. This hysteresis (difference value between the ON temperature Ton and the OFF temperature Toff) is not particularly limited insofar as the hysteresis is a value capable of preventing the switch 46 of the heater 32 or the like from chattering and an operable time of the heater 32 from extending to excess. In other words, when the hysteresis is excessively small, the ON-OFF switching of the heater 32 is repeated within a short period of time, which causes the switch 46 and the relay 42 to be deteriorated. In addition, when the hysteresis is excessively large, more time that is required for the heater 32 to be turned OFF after being turned ON, which eventually leads to an extended operation time of the heater 32 and a deterioration of the heater 32. In view of these problems, the hysteresis has a value of 6° C. in this embodiment.

In this embodiment, the ON temperature Ton (battery temperature lower limit value $Tb_{min}$) and the OFF temperature Toff are changed in accordance with the environmental temperature α. In other words, relatively high temperatures are set as the ON temperature Ton and the OFF temperature Toff in a case where the environmental temperature α is equal to or higher than a prescribed environmental temperature lower limit value $α_{min}$ and relatively low temperatures are set as the ON temperature Ton and the OFF temperature Toff in a case where the environmental temperature α is lower than the environmental temperature lower limit value $α_{min}$. Then, the heater 32 is turned ON or OFF based on the ON temperature Ton and the OFF temperature Toff which are set as described above. This configuration is for the following reason.

According to the related art, the ON temperature Ton (battery temperature lower limit value $Tb_{min}$) and the OFF temperature Toff are constant at all times regardless of the environmental temperature α. For example, Ton is 0° C. and Toff is 6° C. Herein, 0° C. is a lower limit value of the temperature at which the main battery 20 has its performance guaranteed. According to the related art, it is desirable that the temperature of the main battery 20 is equal to or higher than 0° C. at all times. In a case where the vehicle is left unattended in a cryogenic environment, however, the heater 32 has to remain ON for an extended period of time for the temperature of the main battery 20 to be maintained at a temperature of 0° C. or higher, and then the operation time of the heater 32 might show an excessive increase.

Figure 4:
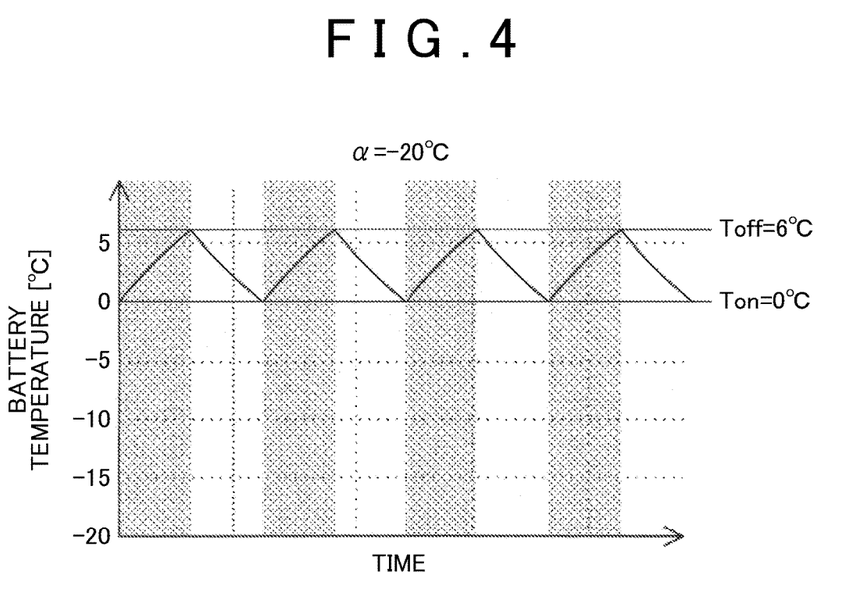
FIG. 4 is a drawing illustrating a battery temperature and a heater operation timing pertaining to a case where a first ON-OFF temperature is set.
Figure 6:
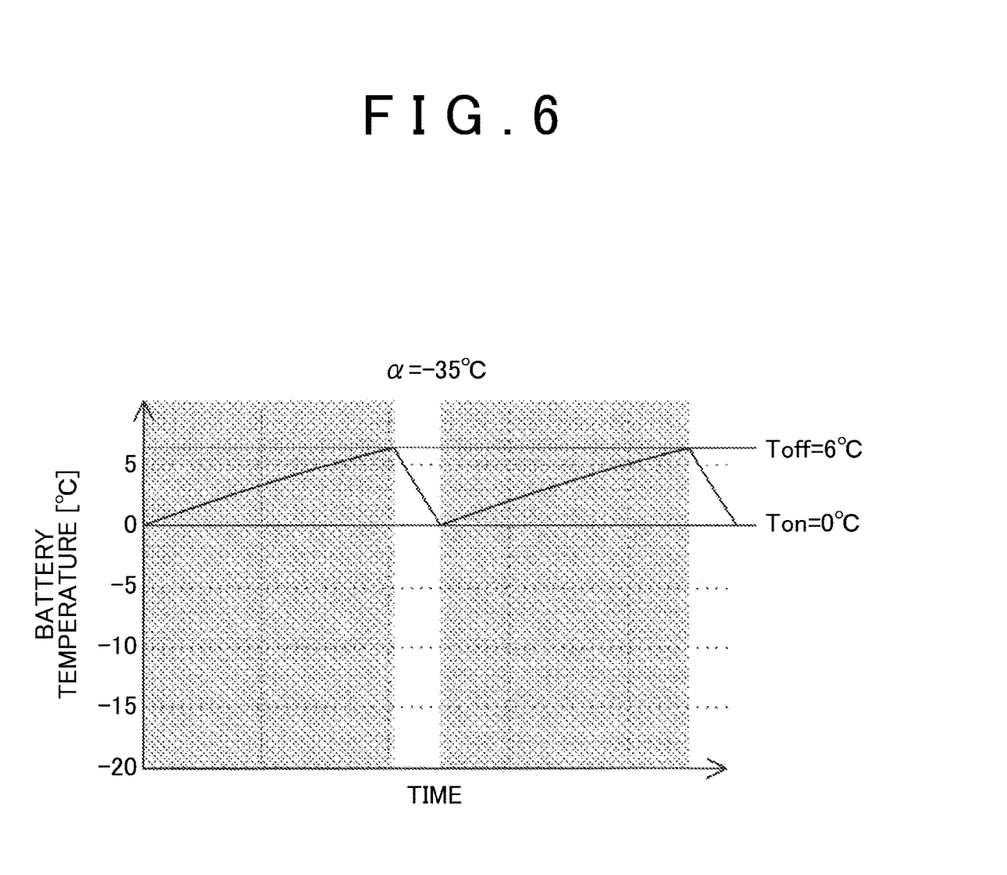
FIG. 6 is a drawing illustrating the battery temperature and the heater operation timing pertaining to a case where the first ON-OFF temperature is set.

This will be described with reference to FIGS. 4 and 6. FIGS. 4 and 6 are drawings illustrating a change in the battery temperature Tb and the operation time of the heater 32 pertaining to a case where Ton is set to 0° C. and Toff is set to 6° C. FIG. 4 shows a case where the environmental temperature α is −20° C. and FIG. 6 shows a case where the environmental temperature α is −35° C. The gray hatching in FIGS. 4 and 6 stands for a period in which the heater 32 is in operation.

As is apparent from a comparison between FIGS. 4 and 6, the heater 32 has an extending operation period as the environmental temperature α decreases. This is because the temperature is unlikely to increase even by the addition of the same amount of heat in a case where the environmental temperature α is low and the temperature is rapidly reduced in a case where no amount of heat is added. As a result, the ratio of the operation time of the heater 32 increases to approximately 85% at an environmental temperature α of −35° C. whereas the ratio of the operation time of the heater 32 is approximately 50% at an environmental temperature α of −20° C. When the ratio of the operation time of the heater 32 increases as described above, the total operation time of the heater 32 increases, and the heater 32 needs to be replaced relatively early.

In this embodiment, the value of the ON temperature Ton and the OFF temperature Toff are reduced in a case where the environmental temperature α is lower than the environmental temperature lower limit value $α_{min}$ so that the above-described problem is avoided. More specifically, in this embodiment, the memory of the controller 26 stores two types of the ON temperature Ton and two types of the OFF temperature Toff, that is, a first ON temperature Ton1, a second ON temperature Ton2, a first OFF temperature Toff1, and a second OFF temperature Toff2. The second ON temperature Ton2 is lower than the first ON temperature Ton1 (Ton2<Ton1). In this embodiment, Ton1 is 0° C. and Ton2 is −15° C. In addition, the second OFF temperature Toff2 is lower than the first OFF temperature Toff1 (Toff2<Toff1). In this embodiment, Toff1 is 6° C. and Toff2 is −9° C.

The driving of the heater 32 is controlled with the first ON temperature Ton1 and the first OFF temperature Toff1 set as the ON temperature Ton and the OFF temperature Toff in a case where the environmental temperature α is equal to or higher than the environmental temperature lower limit value $α_{min}$ and with the second ON temperature Ton2 and the second OFF temperature Toff2 set as the ON temperature Ton and the OFF temperature Toff in a case where the environmental temperature α is lower than the environmental temperature lower limit value $α_{min}$. A temperature at which the vehicle can have its performance guaranteed is set as the environmental temperature lower limit value $α_{min}$. The environmental temperature lower limit value $α_{min}$ at which the hybrid vehicle according to this embodiment has its performance guaranteed is −25° C.

Figure 5:
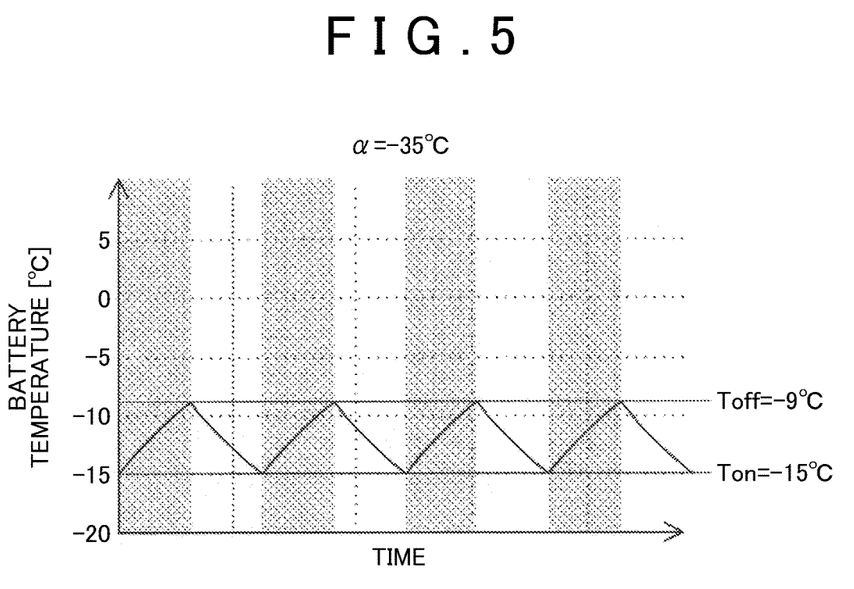
FIG. 5 is a drawing illustrating the battery temperature and the heater operation timing pertaining to a case where a second ON-OFF temperature is set.

FIG. 5 is a drawing illustrating a change in the battery temperature Tb and the operation time of the heater 32 pertaining to a case where Ton is set to −15° C. and Toff is set to −9° C. at an environmental temperature α of −35° C. Both FIGS. 5 and 6 show a result at an environmental temperature α of −35° C. In FIG. 5, however, the values of the ON temperature Ton and the OFF temperature Toff are reduced, and thus the ratio of the operation time of the heater 32 can be significantly reduced in comparison to the case of FIG. 6. As a result, the heater 32 can have a shorter total operation time, and it is possible to advance the time for replacement of the heater 32.

Figure 3:
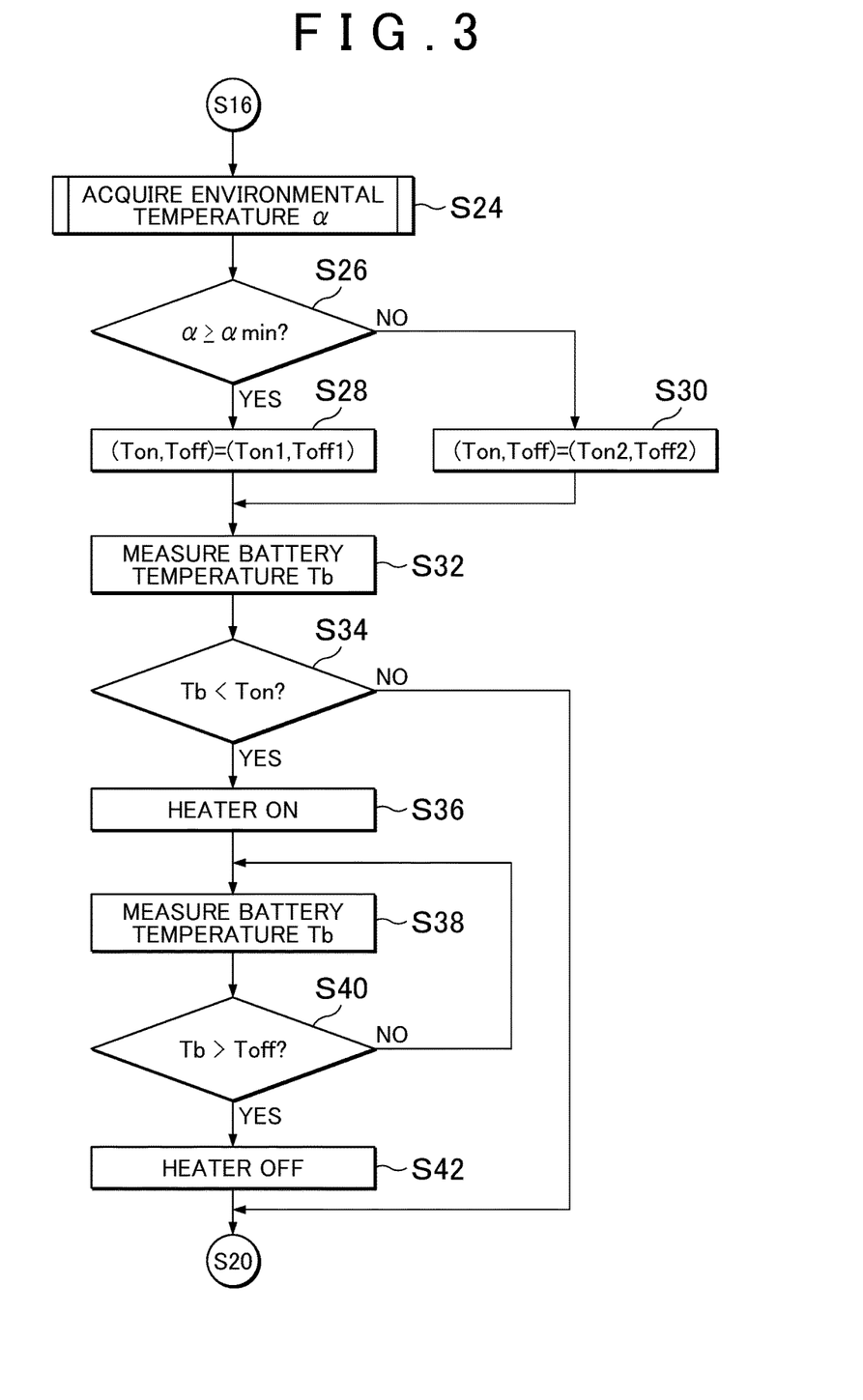
FIG. 3 is a flowchart illustrating a flow of a temperature-raising operation.

FIG. 3 is a flowchart illustrating a flow of the temperature-raising operation according to this embodiment. As illustrated in FIG. 3, the controller 26 acquires the environmental temperature α in the first step of the temperature-raising operation (S24). A flow of the acquisition of the environmental temperature α will be described in detail later.

Then, the acquired environmental temperature α and the environmental temperature lower limit value $\alpha_{min}$ defined in advance are compared to each other, and it is checked whether or not the environmental temperature α is equal to or higher than the environmental temperature lower limit value $\alpha_{min}$ (S26). In a case where α is equal to or higher than $\alpha_{min}$ as a result thereof, the first ON temperature Ton1 (0° C.) and the first OFF temperature Toff1 (6° C.) are set as the ON temperature Ton and the OFF temperature Toff (S28). In a case where α is lower than $\alpha_{min}$, the second ON temperature Ton2 (−15° C.) and the second OFF temperature Toff2 (−9° C.) are set as the ON temperature Ton and the OFF temperature Toff (S30).

Then, the controller 26 acquires the battery temperature Tb that is detected by the temperature sensor 24 (S32). In a case where a plurality of the temperature sensors 24 are disposed, the temperature that is detected by one of the temperature sensors 24 may be acquired as the battery temperature Tb. Alternatively, a statistical value such as the average value and the minimum value of a plurality of the temperatures detected by the plurality of temperature sensors 24 may be acquired as the battery temperature Tb.

After the acquisition of the battery temperature Tb, the battery temperature Tb is compared to the set ON temperature Ton (S34). In a case where the battery temperature Tb is equal to or higher than the ON temperature Ton as a result of the comparison, this flow is terminated without the heater 32 being turned ON. The heater 32 is turned ON in a case where battery temperature Tb is lower than the ON temperature Ton (S36). The temperature of the main battery 20 begins to be raised in this manner.

Then, the controller 26 acquires the battery temperature Tb again (S38) and compares the battery temperature Tb to the OFF temperature Toff (S40). In a case where the battery temperature Tb exceeds the OFF temperature Toff as a result of the comparison, the heater 32 is turned OFF and this flow is terminated (S42). In a case where the battery temperature Tb is equal to or lower than the OFF temperature Toff, Steps S38 and S40 are repeated until Tb becomes higher than Toff.

As is apparent from the above description, the ON temperature Ton and the OFF temperature Toff, which are thresholds for turning ON or OFF the heater 32, are changed in accordance with the environmental temperature α in this embodiment. As a result, the lengthening of the operation time of the heater 32 in a low-temperature environment can be prevented, which can eventually prevent the life of the heater 32 from running out early. In a case where the heating temperature is reduced (set to the second ON-OFF temperatures), in the meantime, a problem is predicted in the form of an extended period of the charging time attributable to a reduction in the charging capacity and a reduction in the allowable charging amount. However, this problem that has the form of a somewhat extended charging time is considered to be less burdensome on the user's part compared to a problem arising from the necessity of frequent exchange of the heater 32. In other words, according to this embodiment, the number of exchanges associated with the heater 32, which is more burdensome on the user's part, can be reduced although the charging time is somewhat extended.

Figure 7:
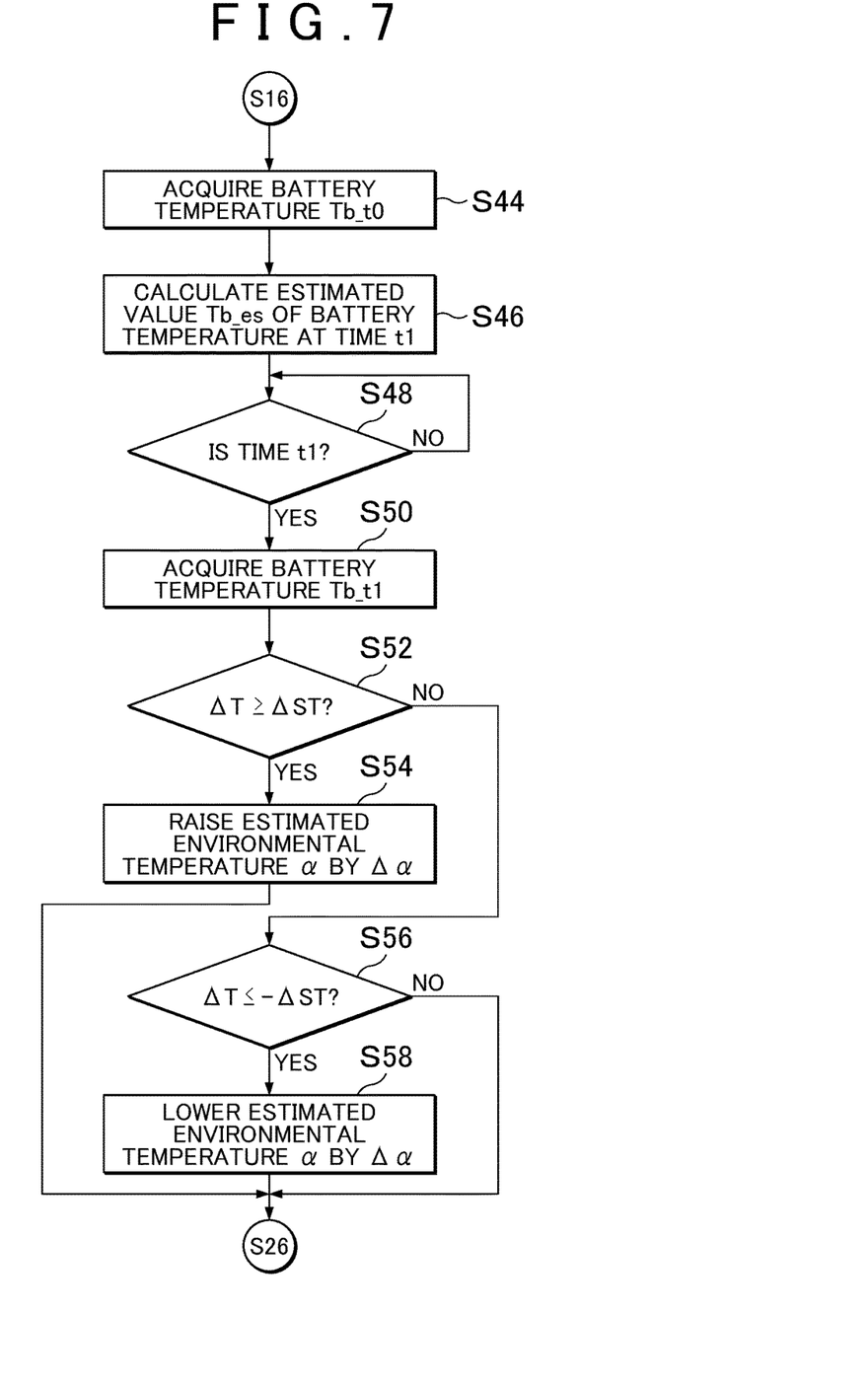
FIG. 7 is a flowchart illustrating a flow of environmental temperature estimation.
Figure 8:
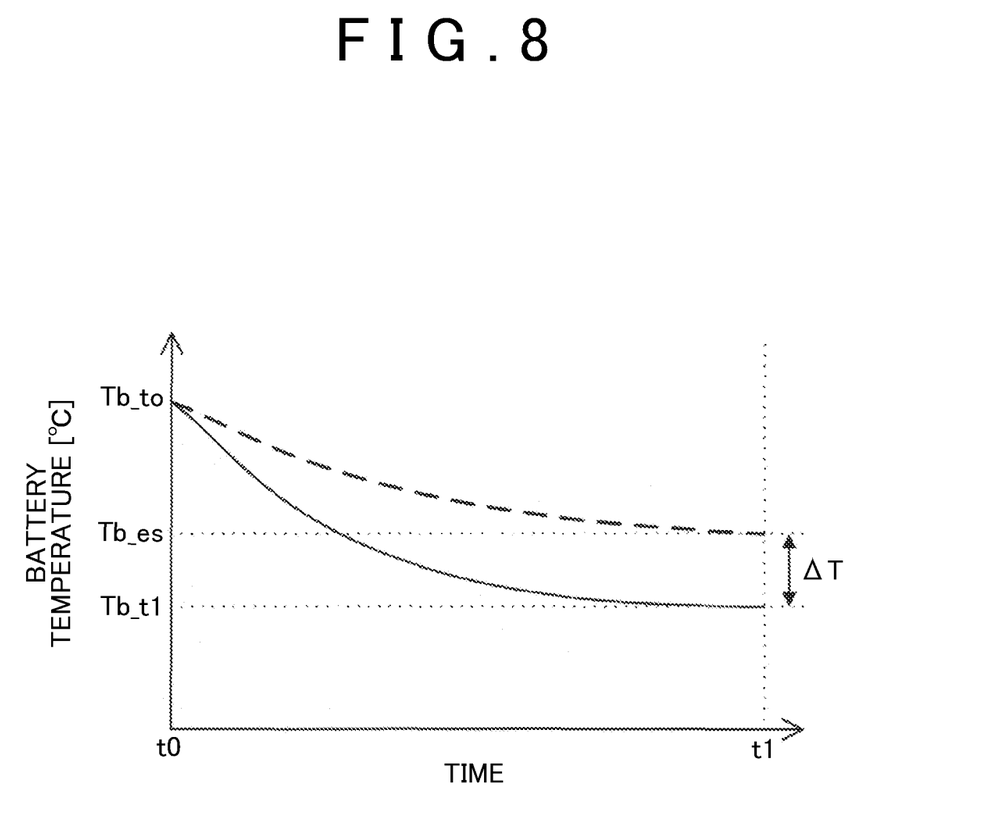
FIG. 8 is a drawing illustrating a principle of the environmental temperature estimation.

Hereinafter, a method for acquiring the environmental temperature α will be described. The environmental temperature α may be detected by the temperature sensor 24 that is disposed in a vehicle body, an intake port of the main battery 20, or the like. In this embodiment, the environmental temperature α is estimated from the battery temperature Tb. This will be described with reference to FIGS. 7 and 8. FIG. 7 is a flowchart illustrating a flow of the estimation of the environmental temperature α from the battery temperature Tb. FIG. 8 is a drawing illustrating a principle of the estimation of the environmental temperature α.

In the first step of the estimation of the environmental temperature α, a battery temperature Tb_t0 at the current point in time (time t0) is acquired (S44). This battery temperature Tb_t0 is a temperature that is detected by the temperature sensor 24 which is disposed in the main battery 20.

Then, an estimated value Tb_es of the battery temperature at time t1, which is the predetermined period of time tw after the current point in time (time t0), is calculated based on the battery temperature Tb_t0 at the current point in time and the estimated environmental temperature α at the current point in time (S46). In other words, a map that shows a correspondence relationship of the estimated temperature Tb_es to the battery temperature Tb_t0 and the estimated environmental temperature α at the current point in time may be stored in, for example, the memory 28 of the controller 26 and the estimated temperature Tb_es may be acquired by the use of this map. Alternatively, an arithmetic expression that shows the correspondence relationship of the estimated temperature Tb_es to the battery temperature Tb_t0 and the estimated environmental temperature α at the current point in time may be stored in the memory 28 of the controller 26 and the estimated temperature Tb_es may be calculated based on the application of the current Tb_t0 and α to the arithmetic expression. The following Equation 2 or the like can be used as the arithmetic expression, in which D is a prescribed constant.

$$Tb\_es = (Tb\_t0 - \alpha)e^{-D \cdot tw} + \alpha \qquad \text{[Equation 2]}$$

After the acquisition of the estimated temperature Tb_es of the battery temperature Tb at time t1, the controller 26 stands by until time t1 (S48). Then, at time t1, the controller 26 acquires a battery temperature Tb_t1 detected by the temperature sensor 24 (S50). After the acquisition of the battery temperature Tb_t1, the amount of deviation between the battery temperature Tb_t1 and the estimated temperature Tb_es is calculated, and the environmental temperature α is changed in accordance with the obtained amount of deviation. In other words, the controller 26 calculates ΔT=Tb_t1−Tb_es by subtracting the estimated temperature Tb_es from the battery temperature Tb_t1, and checks whether or not the difference value ΔT is equal to or higher than a prescribed threshold ΔST (S52). In a case where ΔT is equal to or higher than ΔST, the estimated environmental temperature α at the current point in time is considered to be lower than the actual environmental temperature $\alpha$, and thus a value that is obtained by adding a prescribed constant value $\Delta\alpha$ to the current estimated environmental temperature $\alpha$ is obtained as a new estimated environmental temperature $\alpha$ (S54). In a case where $\Delta T$ is lower than $\Delta ST$, it is checked whether or not the difference value $\Delta T$ is equal to or lower than a prescribed threshold $-\Delta ST$ (S56). In a case where $\Delta T$ is equal to or lower than $-\Delta ST$, the estimated environmental temperature $\alpha$ at the current point in time is considered to be higher than the actual environmental temperature $\alpha$, and thus a value that is obtained by subtracting the prescribed constant value $\Delta\alpha$ from the current estimated environmental temperature $\alpha$ is obtained as a new estimated environmental temperature $\alpha$ (S58). In a case where $\Delta T$ exceeds $-\Delta ST$, the estimated environmental temperature $\alpha$ at the current point in time and the actual environmental temperature $\alpha$ are considered to have no significant difference from each other, and thus the estimated environmental temperature $\alpha$ at the current point in time is used as it is. Then, the estimated environmental temperature $\alpha$ is learned by the same processing being repeated.

A case where the threshold $\Delta ST$ is 1° C., Tb_t1 is 5° C., Tb_es is 2° C., and $\Delta T$ is 3° C. can be considered as a specific example for description. In this case, it is conceivable that the actual battery temperature Tb_t1 is higher than the estimated temperature Tb_es because the actual environmental temperature is higher than the estimated environmental temperature $\alpha$. Accordingly, in this case, it is desirable that the estimated environmental temperature $\alpha$ is raised such that the estimated environmental temperature $\alpha$ becomes close to the actual environmental temperature. Accordingly, in a case where Tb_t1 is 5° C., Tb_es is 2° C., and $\Delta T$ is 3° C., a Yes determination is made in Step S52, the processing proceeds to Step S54, and the estimated environmental temperature $\alpha$ is raised. A case where Tb_t1 is 0° C., Tb_es is 2° C., and $\Delta T$ is $-2$° C. is also conceivable. In this case, it is conceivable that the actual battery temperature Tb_t1 is lower than the estimated temperature Tb_es because the actual environmental temperature is lower than the estimated environmental temperature $\alpha$. Accordingly, in this case, it is desirable that the estimated environmental temperature $\alpha$ is lowered such that the estimated environmental temperature $\alpha$ becomes close to the actual environmental temperature. Accordingly, in a case where Tb_t1 is 0° C., Tb_es is 2° C., and $\Delta T$ is $-2$° C., a Yes determination is made in Step S56, the processing proceeds to Step S58, and the estimated environmental temperature $\alpha$ is lowered. A case where Tb_t1 is 2.5° C., Tb_es is 2° C., and $\Delta T$ is 0.5° C. is also conceivable. In this case, the deviation between the actual battery temperature Tb_t1 and the estimated temperature Tb_es is smaller than the allowable value $\Delta ST=1$° C. In this case, the estimated environmental temperature $\alpha$ is considered to have a small deviation from the actual environmental temperature as well. Accordingly, in this case, it is desirable that the estimated environmental temperature $\alpha$ is maintained at the current value without being changed. Accordingly, in this case, No determinations are made in Steps S52 and S56 and the estimated environmental temperature $\alpha$ is not changed. When the environmental temperature $\alpha$ is estimated based on the battery temperature Tb as described above, no dedicated temperature sensor 24 for detecting the environmental temperature $\alpha$ is necessary, and thus costs can be reduced.

Each of the configurations that have been described above is merely an example, and can be appropriately modified insofar as the threshold used as a reference for turning ON or OFF the heater 32 is reduced in accordance with a reduction in the environmental temperature $\alpha$. For example, the ON temperature Ton and the OFF temperature Toff may be changed in three or more stages although the ON temperature Ton and the OFF temperature Toff are changed in two stages in accordance with the environmental temperature $\alpha$ in this embodiment. In addition, the ON temperature Ton and the OFF temperature Toff may be continuously changed in accordance with the environmental temperature $\alpha$ instead of being changed in stages. For example, the ON temperature Ton and the OFF temperature Toff may be calculated based on an arithmetic expression in which the environmental temperature $\alpha$ is used as a variable.

In this embodiment, the ON temperature Ton and the OFF temperature Toff have a constant difference value, that is, hysteresis. However, this hysteresis may also be changed in accordance with the environmental temperature $\alpha$. In addition, only one of the ON temperature Ton and the OFF temperature Toff may be changed without the other one of the ON temperature Ton and the OFF temperature Toff being changed. For example, the ON temperature Ton may be lowered with the OFF temperature Toff being maintained as it is when the environmental temperature $\alpha$ is lowered.

In this embodiment, both the ON temperature Ton and the OFF temperature Toff are used in the driving control for the heater 32. However, only either one of the two may be used for the purpose. For example, the heater 32 may be controlled to be turned ON below the ON temperature Ton and then be turned OFF after the passage of a predetermined period of time. In this case, only the ON temperature Ton may be changed in accordance with the environmental temperature $\alpha$.

The method for estimating the environmental temperature $\alpha$ may also be appropriately modified from that illustrated in FIG. 7. In this embodiment, the constant value $\Delta\alpha$ is added or subtracted to or from the environmental temperature $\alpha$ when the error $\Delta T$ between the estimated temperature Tb_es and the actual battery temperature Tb_t1 is at least a certain value. However, this value that is added or subtracted may be changed in accordance with the magnitude of the error $\Delta T$. In addition, merely whether or not the current environmental temperature $\alpha$ is equal to or higher than the environmental temperature lower limit value $\alpha_{min}$ may be estimated without the estimation of the specific numerical value of the environmental temperature $\alpha$. For example, the environmental temperature $\alpha$ may be determined to be lower than the environmental temperature lower limit value $\alpha_{min}$ in a case where the battery temperature Tb_t1 actually detected after the passage of a predetermined period of time is lower than the estimated temperature Tb_es and the environmental temperature $\alpha$ may be determined to be equal to or higher than the environmental temperature lower limit value $\alpha_{min}$ in a case where the detected battery temperature Tb_t1 is equal to or higher than the estimated temperature Tb_es with the estimated temperature Tb_es after the passage of the predetermined period of time estimated on the assumption that the current environmental temperature $\alpha$ corresponds to the environmental temperature lower limit value $\alpha_{min}$. Then, it may be determined, in accordance with a result of the determination, which of the first ON-OFF temperatures and the second ON-OFF temperatures to be adopted. In this embodiment, the temperature-raising device is incorporated into the hybrid vehicle. However, the temperature-raising device may be incorporated into any vehicle including the hybrid vehicle in which a battery (including a fuel cell) is mounted, examples of which include an electric car and a fuel cell vehicle.

What is claimed is:

1. A temperature-raising device for an in-car battery, the temperature-raising device comprising:
   a battery temperature acquisition unit configured to acquire a temperature of a battery mounted in a vehicle;
   an environmental temperature acquisition unit configured to acquire an environmental temperature;
   a heater configured to raise the temperature of the battery; and
   a controller configured to
   i) turn ON or OFF the heater based on a result of a comparison between the battery temperature acquired by the battery temperature acquisition unit and a predetermined threshold, and
   ii) reduce the threshold in accordance with a reduction in the environmental temperature acquired by the environmental temperature acquisition unit,
   wherein the battery temperature acquisition unit includes a temperature sensor installed around the in-car battery, and
   wherein the environmental temperature acquisition unit is configured to estimate the environmental temperature based on a battery temperature detected by the temperature sensor, and
   wherein the environmental temperature acquisition unit is configured to
   i) estimate a battery temperature after a passage of a predetermined period of time based on an estimated environmental temperature at a current point in time and the battery temperature detected by the temperature sensor at the current point in time, and
   ii) correct the estimated environmental temperature in accordance with an error between the battery temperature detected by the temperature sensor and the estimated battery temperature after the passage of the predetermined period of time.

2. The temperature-raising device according to claim 1, wherein the controller is configured to
   i) set the threshold to a standard value defined in advance in a case where the environmental temperature acquired by the environmental temperature acquisition unit is equal to or higher than a reference environmental temperature defined in advance, and
   ii) set the threshold to a value lower than the standard value in a case where the environmental temperature acquired by the environmental temperature acquisition unit is lower than the reference environmental temperature.

3. The temperature-raising device according to claim 1, wherein the controller is configured to execute a temperature-raising operation for the in-car battery in a plug-in state where the in-car battery is electrically connected to an external electric power supply.

4. A temperature-raising method for a battery mounted in a vehicle,
   the vehicle including a temperature sensor configured to acquire a temperature of the battery and a controller, the temperature-raising method comprising:
   acquiring the temperature of the battery mounted in the vehicle by the temperature sensor;
   turning ON or OFF the heater raising the temperature of the battery by the controller based on a result of a comparison between the acquired battery temperature and a predetermined threshold;
   acquiring an environmental temperature of the vehicle by the controller; and
   reducing the threshold by the controller in accordance with a reduction in the acquired environmental temperature,
   wherein the acquiring the environmental temperature includes estimating the environmental temperature based on a battery temperature detected by the temperature sensor, including:
   i) estimating a battery temperature after a passage of a predetermined period of time based on an estimated environmental temperature at a current point in time and the battery temperature detected by the temperature sensor at the current point in time, and
   ii) correcting the estimated environmental temperature in accordance with an error between the battery temperature detected by the temperature sensor and the estimated battery temperature after the passage of the predetermined period of time.

* * * * *